(12) United States Patent
Mardikar et al.

(10) Patent No.: US 10,678,902 B2
(45) Date of Patent: *Jun. 9, 2020

(54) AUTHENTICATION BASED ON CHANGES IN FINGERPRINT MINUTIA

(71) Applicant: American Express Travel Related Services Company, Inc., New York, NY (US)

(72) Inventors: Upendra Mardikar, San Jose, CA (US); Wael Ibrahim, San Diego, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,335

(22) Filed: Dec. 7, 2018

(65) Prior Publication Data

US 2019/0114408 A1 Apr. 18, 2019

Related U.S. Application Data

(63) Continuation of application No. 14/860,375, filed on Sep. 21, 2015, now Pat. No. 10,181,020.

(51) Int. Cl.
*G06F 21/32* (2013.01)
*G06K 9/00* (2006.01)
*G06F 21/45* (2013.01)

(52) U.S. Cl.
CPC ......... *G06F 21/32* (2013.01); *G06K 9/00006* (2013.01); *G06K 9/00355* (2013.01);
(Continued)

(58) Field of Classification Search
None
See application file for complete search history.

(56) References Cited

U.S. PATENT DOCUMENTS 7,818,791 B2 * 10/2010 Cheng ................. H04L 63/0861
726/2
8,412,928 B1 4/2013 Bowness
(Continued)

FOREIGN PATENT DOCUMENTS

GB 2467975 8/2010

OTHER PUBLICATIONS

International Search Report and Written Opinion dated Oct. 24, 2016 in Application No. PCT/US2016/047384.
(Continued)

*Primary Examiner* — Venkat Perungavoor
(74) *Attorney, Agent, or Firm* — Thomas | Horstemeyer, LLP

(57) ABSTRACT

A system receives a source and a metadata layer that describes the source. The source may comprise source records with fields containing source data, and the metadata layer may include metadata comprising at least one of a field data type, a field data length, a field description, or a record length. The processor may further validate the metadata layer against the source and write results to a log. The processor may further be configured for transforming the source records into transformed records for a load ready file. The processor may further balance a number of records in the source against a number of transformed records in the load ready file to generate a transformation failure rate.

20 Claims, 6 Drawing Sheets

(52) U.S. Cl.
CPC ..... *G06K 9/00892* (2013.01); *G06K 9/00926* (2013.01); *G06K 2009/00953* (2013.01)

(56) References Cited

U.S. PATENT DOCUMENTS

| | | |
|---|---|---|
| 2004/0239648 A1 | 12/2004 | Abdallah |
| 2004/0250084 A1 | 12/2004 | Hamid |
| 2005/0105782 A1* | 5/2005 | Abiko ............... G06K 9/00026 382/124 |
| 2007/0005963 A1 | 1/2007 | Eldar |
| 2009/0067679 A1* | 3/2009 | Mainguet ........... G06K 9/00026 382/115 |
| 2009/0235339 A1 | 9/2009 | Mennes |
| 2009/0328182 A1 | 12/2009 | Maloakapalli et al. |
| 2010/0158327 A1 | 6/2010 | Kangas |
| 2010/0183230 A1 | 7/2010 | Huang |
| 2010/0284565 A1* | 11/2010 | Benkley ................. G06T 7/248 382/103 |
| 2011/0010558 A1* | 1/2011 | Baldan ............... G06K 9/00087 713/186 |
| 2012/0269406 A1* | 10/2012 | Kraemer ........... G06K 9/00026 382/124 |
| 2013/0047223 A1 | 2/2013 | Headley |
| 2013/0191899 A1 | 7/2013 | Eldefrawy et al. |
| 2014/0003677 A1 | 1/2014 | Han et al. |
| 2014/0226879 A1 | 8/2014 | Westerman et al. |
| 2014/0250490 A1 | 9/2014 | Beca et al. |
| 2014/0270414 A1 | 9/2014 | Slaby |
| 2014/0300574 A1 | 10/2014 | Benkley, III et al. |
| 2014/0365780 A1 | 12/2014 | Movassaghi |
| 2014/0369572 A1 | 12/2014 | Setlak |
| 2015/0131878 A1* | 5/2015 | Kim .................. G06K 9/00073 382/125 |
| 2015/0169860 A1 | 6/2015 | Kim |
| 2015/0213244 A1 | 7/2015 | Lymberopoulos |
| 2015/0261692 A1 | 9/2015 | Benedeiit |
| 2015/0339670 A1 | 11/2015 | Shaked |
| 2015/0341349 A1 | 11/2015 | Mandal |
| 2015/0356286 A1 | 12/2015 | Quirk |
| 2016/0098087 A1 | 4/2016 | Morley |

OTHER PUBLICATIONS

International Preliminary Report on Patentability dated Jan. 5, 2018 in International Application No. PCT/US16/47384.
USPTO; Final Office Action dated Aug. 15, 2018 in U.S. Appl. No. 15/680,585.
USPTO; Advisory Action dated Oct. 12, 2018 in U.S. Appl. No. 15/680,585.
USPTO; Non-Final Office Action dated Mar. 29, 2018 in U.S. Appl. No. 15/680,585.
Hea Suk Jo and Hee Yong Youn; A Secure User Authentication Protocol Based on One-Time-Password for Home Network; ICCSA 2005, LNCSA 3480 pp. 519-528, 2005. Springer-Verlag Berlin Hiedelberg.
Tan Teirk Guan; An Enhanced One-Time Password implementation; Data Security Systems Solutions Pte Ltd, Singapore http://www.dssasia.com.
KR 20140106360 English Translation. Estorm Co. Ltd. (Year: 2014).
USPTO; Office Action dated Mar. 10, 2017 in U.S. Appl. No. 14/860,420.
USPTO; Notice of Allowance dated Jul. 25, 2017 in U.S. Appl. No. 14/860,420.
USPTO; Non-Final Office Action dated Mar. 2, 2017 in U.S. Appl. No. 14/860,375.
USPTO; Final Office Action dated Jul. 14, 2017 in U.S. Appl. No. 14/860,375.
USPTO; Advisory Action dated Sep. 15, 2017 in U.S. Appl. No. 14/860,375.
USPTO; Non-Final Office Action dated Oct. 26, 2017 in U.S. Appl. No. 14/860,375.
USPTO; Final Office Action dated Jan. 26, 2018 in U.S. Appl. No. 14/860,375.
USPTO; Advisory Action dated Mar. 13, 2018 in U.S. Appl. No. 14/860,375.
USPTO; Non-Final Office Action dated Jun. 15, 2018 in U.S. Appl. No. 14/860,375.
USPTO; Notice of Allowance dated Nov. 15, 2018 in U.S. Appl. No. 14/860,375.
Fingerprint Deformation Models Using Minutiae Locations and Orientations. Chen et al. IEEE(2005).

* cited by examiner

US 10,678,902 B2

AUTHENTICATION BASED ON CHANGES IN FINGERPRINT MINUTIA

CROSS REFERENCE TO RELATED APPLICATIONS

This application is a continuation of, claims priority to and the benefit of, U.S. Ser. No. 14/860,375 filed Sep. 21, 2015 and entitled "SYSTEMS AND METHODS FOR GESTURE BASED BIOMETRIC SECURITY," which is incorporated by reference in its entirety for all purposes.

FIELD

The present disclosure relates to security systems based on biometric transformation at various points along a gesture.

BACKGROUND

User authentication systems play an important security role in data protection as sensitive data is increasingly stored behind electronic authentication walls. Mobile devices, computers, and secure rooms may all be protected by various types of authentication. Many mobile devices may authenticate users using a four-digit pin or a simple fingerprint, for example. These authentication systems tend to limit access to sensitive data to those individuals having the correct authentication key. However, single-factor and/or weak authentication techniques may be more readily attacked than stronger counterparts.

Many authentication mechanisms today can be classified as simple authentication mechanisms. The simple authentication methods may, for example, use single-factor approaches. The technology available to attackers has progressed and may threaten the security of many simple authentication mechanisms. The vulnerability may extend to multi-factor authentication methods that depend on two or more such simple mechanisms. For example, in a 2-factor authentication mechanism, a user may be required to enter a password in addition to scanning a finger print. Both the password and the finger print scan representation individually are considered "simple" authentication mechanisms. The fingerprint and password are checked independently of one another, with neither having any bearing on the validation of the other. The combination of simple authentication mechanisms without a logical linkage between them may limit the resulting security benefit, leaving such simple authentication mechanisms vulnerable to potential attacks.

SUMMARY

A system, method, and computer readable medium (collectively, the "system") is disclosed for compound-factor user authentication using gesture based biometrics. The system may comprise reading a first gesture made by a first fingerprint on a scanner. The first fingerprint may transform in response to the first gesture. The system may convert the first gesture into a plurality of fingerprint templates and/or a transformation of the fingerprint templates. The fingerprint templates may capture a change in fingerprint minutia detected by the scanner in response to the first gesture. The system may also store the plurality of fingerprint templates and/or the transformation of the plurality of fingerprint templates. An authentication request may be received comprising a second gesture made by a second fingerprint on the scanner. The system may match the second gesture to the first gesture using the plurality of fingerprint templates and/or the transformation of the plurality of fingerprint templates.

In various embodiments, the system may convert the second gesture into a second plurality of fingerprint templates and compare the plurality of fingerprint templates to the second plurality of fingerprint templates. The fingerprint minutia detected by the scanner may comprise at least one of a crossover, a core, a bifurcation, a ridge ending, an island, a delta, a pore, an enclosure, or a spur. The transformation may also include at least one of a movement or a deformation of the fingerprint minutia detected by the scanner. The fingerprint templates and/or the transformation of the fingerprint templates may be stored as matrix transformations. The system may authorize a user in response to the matching the second gesture to the first gesture. The system may also check the second fingerprint against the first fingerprint and invalidate a user in response to the second fingerprint not matching the first fingerprint.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. For example, a first fingerprint template may match a second fingerprint template in response to the templates being sufficiently similar even though the fingerprint templates are not identical. Similarly, as used herein, "authenticate" or similar terms may include an exact authentication, a partial authentication, authenticating a subset of data, a correspondence, satisfying certain criteria, an association, an algorithmic relationship and/or the like.

The present disclosure provides a system, method, and computer program product for authenticating users using fingerprint transformations in response to gestures. The system may register a fingerprint, a gesture, and/or the transformation of the fingerprint at various stages of the gesture. As a user places her finger on the device and moves her finger across the device to complete a gesture, the device may read the position and shape of the fingerprint and the transformation of the fingerprint (i.e., the variance in the fingerprint and displacement of the fingerprint during the gesture). The read data may be compared to a local, securely-stored digital representation of the fingerprint and gesture. A match may signal successful authentication, and no match may indicate a failed authentication.

Figure 1A:
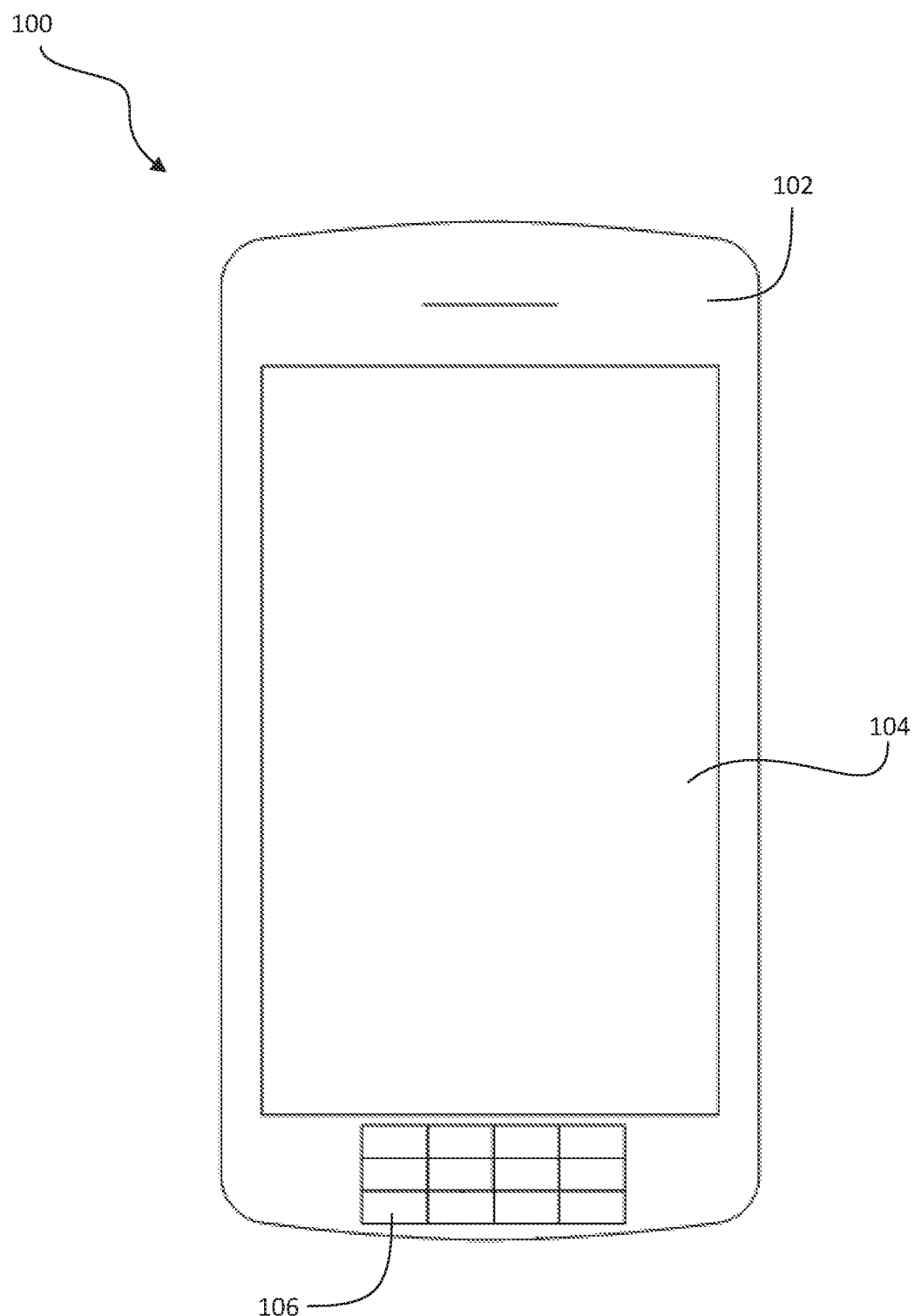
FIGS. 1A-1C illustrate an exemplary device having an interface to read and store a gesture-based biometric input, in accordance with various embodiments.

With reference to FIG. 1A, an exemplary authentication device 100 is shown, in accordance with various embodiments. Authentication device 100 may comprise any device capable of scanning, storing, processing, and matching fingerprints and fingerprint transformations resultant from a finger gesture. For example, authentication device 100 may take the form of a computer or processor, or a set of computers/processors, such as a computer, laptop, notebook, hand held computer, personal digital assistant, cellular phone, smart phone (e.g., iPhone®, BlackBerry®, Android®, etc.), tablet, wearable (e.g., smart watch and smart glasses), track pad, dedicated fingerprint and gesture scanning system, or any other device capable of matching a provided fingerprint and gesture to stored values.

Authentication device 100 may comprise a housing 102 for electrical components and interface mechanisms. Authentication device 100 may further include an output display 104. Output display 104 may be, for example, a display screen capable of reading fingerprints and gestures as well as displaying visual output to a user. Output display 104 may also be a capacitive touchscreen, an LED display screen, and/or any other suitable screen for displaying visual output. A scanner 106 may also be integrated into housing 102. Scanner 106 may be a single scanner or a plurality of scanners configured to scan a fingerprint, a gesture, and/or the transformations in a fingerprint throughout a gesture. In that regard, scanner 106 may have sufficient resolution to detect ridges in fingerprints and changes in the relative positions of the ridges in the fingerprints as the gesture is made. In various embodiments, scanner 106 and output display 104 may be integrated into a single component that provides both input and output for authentication device 100.

Figures 1B, 1C:
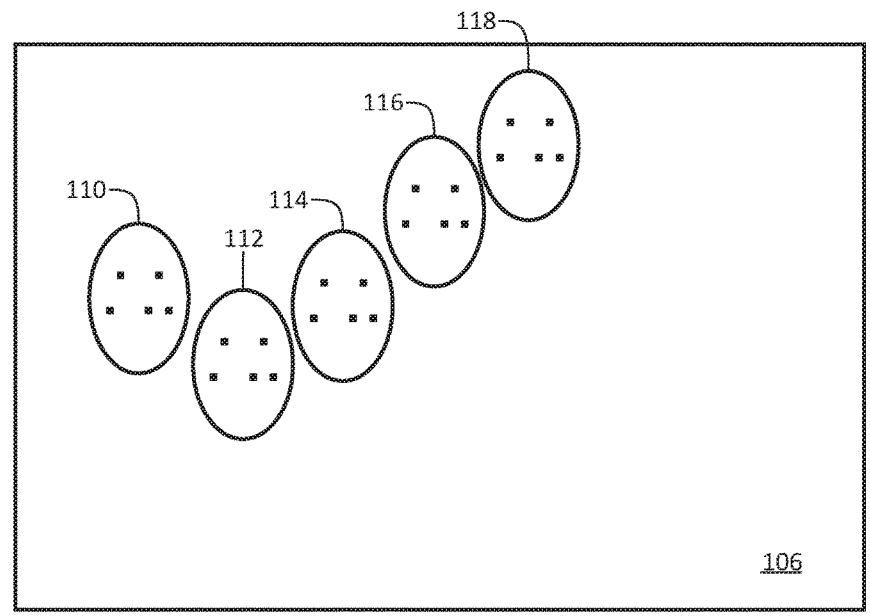

With reference to FIG. 1B, a series of fingerprint scans taken on scanner 106 during a gesture is shown, in accordance with various embodiments. The fingerprint scans depicted may occur in an order indicative of the gesture being made on scanner 106. For example, the gesture in FIG. 1B is similar to a check mark. The check-mark gesture may begin with a scan of print 110 on scanner 106. Print 110 may include fingerprint minutiae 111 detected and identified by scanner 106. As the gesture is made, the fingerprint scans may be captured in order. For example, in response to a user drawing the gesture on scanner 106 print 110 may be scanned, then print 112 may be scanned, then print 114 may be scanned, then print 116 may be scanned, then print 118 may be scanned. In that regard, scanner 106 may capture a plurality of prints in the order the prints appear during the gesture.

In various embodiments, the fingerprint minutiae 111 may translate, move, deform, and/or otherwise change temporarily during the gesture. For example, during the gesture the scanner may detect five points of fingerprint minutiae 111 in print 110 taken at the beginning of the gesture. In the subsequent prints, the same fingerprint minutiae 111 may be identified having the same or varied characteristics in response to manipulation of the fingerprint during the gesture. Continuing with the above example, the five points of fingerprint minutiae 111 may be identified in print 112 as having translated from the first location of print 110 to the second location of print 112. The variation in the location of the fingerprint minutiae 111 may be captured using scanner 106. Although two-dimensional translation of fingerprint minutia is illustrated in FIG. 1B, other transformations may be detected such as movement, rotation, scale, velocity, and/or pressure on sensor, for example.

With reference to FIGS. 1B and 1C, an exemplary representation of fingerprint minutiae 111 during the gesture of FIG. 1B is shown. Each print in FIG. 1A may be represented digitally in matrix form, for example. Matrix 120 may capture fingerprint minutiae 111 of print 110 at a first location and store representative data in a non-image form. Similarly, matrix 122 may correspond to print 112, matrix 124 may correspond to print 114, matrix 126 may correspond to print 116, and matrix 128 may correspond to print 118. In that regard, transformations and translations of fingerprint minutiae 111 in response to the gesture moving from print 110 at a first location, to print 112 at a second location, and to subsequent prints may be represented digitally by matrix transformations applicable to transform matrix 120 into matrix 122. Although matrices are provided as an exemplary data structure, suitable data structures for digital storage may include arrays, coordinates, XML, JSON, strings, or any other data format suitable for capturing a digital, non-image representation of fingerprint and transformation data.

Figure 2:
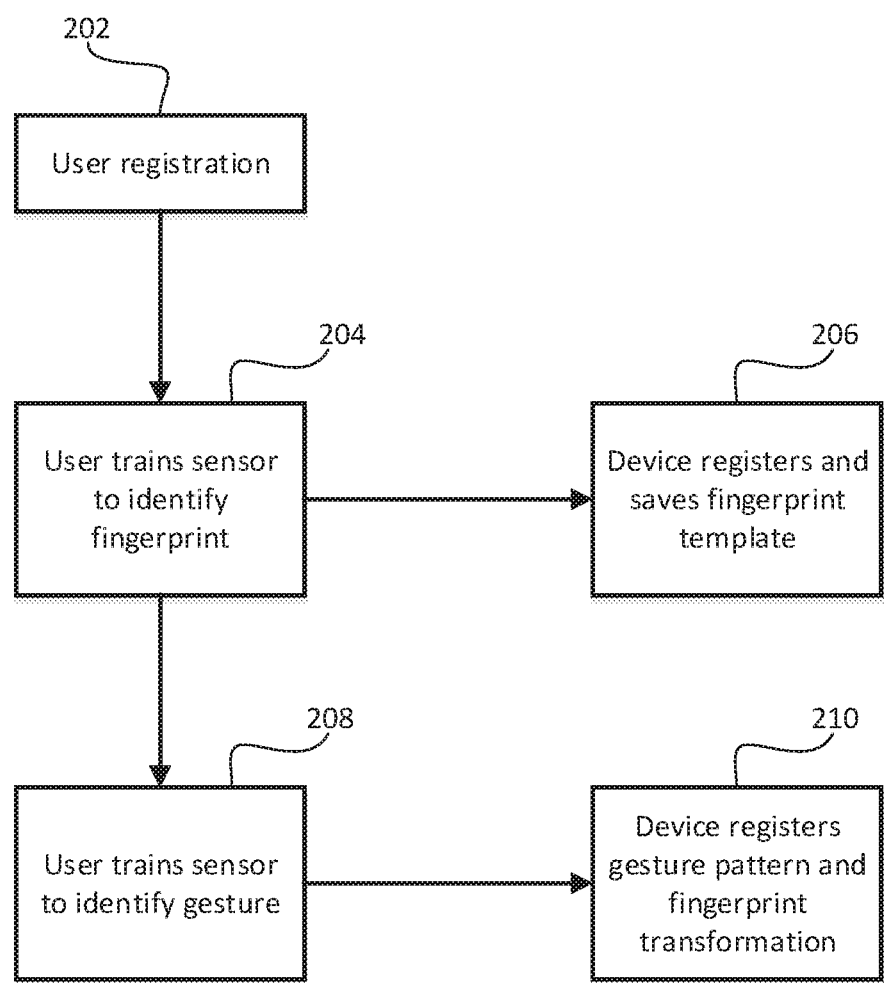
FIG. 2 illustrates an exemplary registration system for interaction between a user and an authentication device for registration of a gesture-based biometric key, in accordance with various embodiments.

With reference to FIG. 2, a system 200 of user interaction with authentication device 100 is shown for gesture and fingerprint registration, in accordance with various embodiments. A user may begin the user registration process by selecting user registration on authentication device 100 (Block 202). The user registration process may cause authentication device 100 to save the biometric information identifying the user for validation at a later time. The process may begin with the user training the scanner 106 to identify a fingerprint (Block 204). A user may place her finger on scanner 106 so that scanner 106 may read the finger print. Authentication device 100 may prompt the user to scan the same finger multiple times to generate a set of readings reflecting the fingerprint more accurately than a single reading. For example, the user may place her finger on the scanner in various locations on the scanner with the fingerprint in various orientations relative to the scanner.

In various embodiments, the readings may identify and evaluate fingerprint minutiae including crossovers, cores, bifurcations, ridge endings, islands, deltas, pores, enclosures, spurs, and/or any other parts of a fingerprint suitable for use in identification. The minutia of the fingerprint may be transformed into a fingerprint template in a digital format suitable for storage on authentication device 100. For example, the minutia may be stored in a digital representation of a matrix as illustrated in FIG. 1C. The fingerprint template, made from the fingerprint scans, may be partially or fully unique from person to person so that the fingerprint template may be used to authenticate the user.

In various embodiments, authentication device 100 may register and save the fingerprint template (Block 206). The fingerprint template may be stored locally on authentication device 100. The fingerprint template may also be hashed, encrypted, and otherwise securely stored to protect the fingerprint template from attack. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Data such as fingerprint templates may be stored on authentication device 100 in an encrypted, salted, or otherwise obfuscated format to enhance security.

In various embodiments, the user may then train scanner 106 to identify a gesture (Block 208). Authentication device 100 may identify the gesture individually from the fingerprint as a form of single-factor authentication. However, authentication device 100 may provide greater security by recognizing the transformations that occur in the fingerprint in response to the gesture being performed by the user. Transformations may be recognized by comparing the raw data representative of the various fingerprint scans and identifying the differences. In that regard, the user trains authentication device 100 to recognize transformations in the fingerprint by identifying the fingerprint at various points throughout the gesture as represented in a digital format. For example, authentication device 100 may identify one or more piece of fingerprint minutia to track during a gesture and associate the minutia with a user for later authorization.

In various embodiments, the piece of minutia may deform and move relative to other minutia in the fingerprint during the gesture. Fingerprint minutia may also have a positional displacement corresponding to the start position of the gesture and the point of measurement in during gesture. Authentication device 100 may prompt the user to repeat the gesture several times to track the minutia during the gesture. The transformation that occurs during the gesture integrates both the fingerprint and gesture into a single, integrated key.

In various embodiments, authentication device 100 may register the gesture pattern and fingerprint transformation (Block 210). During registration authentication device 100 may identify, track, and/or store changes in fingerprint minutia such as coordinates, movement, rotation, scale, velocity, pressure on sensor, and or duration on sensor during the gesture. The gesture pattern may be stored in a separate data structure from, or integrally in the same data structure as, the fingerprint transformation. For example, the fingerprint transformation and gesture may be stored as an ordered series of fingerprint templates (e.g., a series of matrices similar to that depicted in FIG. 1C) that inherently contain both fingerprint data and gesture data in the form of the transformations occurring between each of the ordered fingerprint templates. A fingerprint template may be any digital representation of fingerprint data in non-image form. In that regard, the series of fingerprint templates recorded during a gesture may directly store fingerprint data and indirectly store gesture data. The gesture and fingerprint data may also be stored in the form of transformations between fingerprint templates at various stages of the gesture. For example, the gesture and fingerprint data may be saved as matrix transformations to be applied to a fingerprint template stored in matrix form. For example, transformations may be applied to fingerprint templates stored as matrices by matrix operations such as matrix multiplication, matrix addition, scaling, row operations, and/or reduction.

Figure 3:
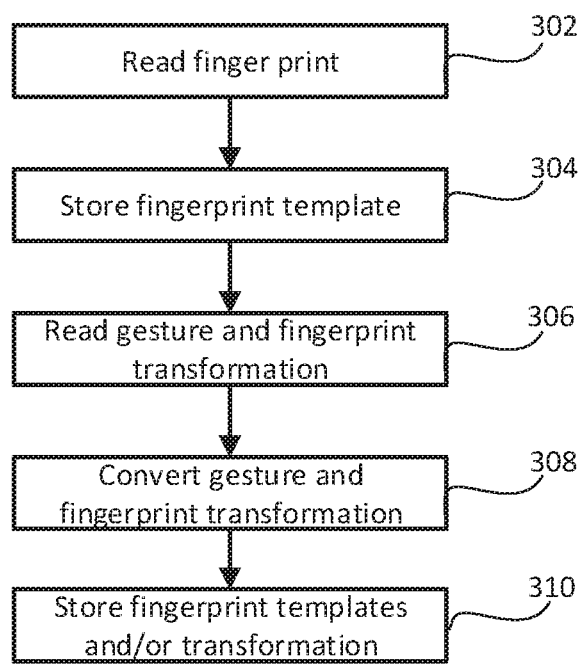
FIG. 3 illustrates an exemplary process for execution by an authentication device to register a gesture-based biometric key, in accordance with various embodiments.

With reference to FIG. 3, a process 300 for reading and storing a fingerprint and gesture on authentication device 100 is shown, in accordance with various embodiments. Authentication device 100 may start by reading a fingerprint (Block 302). The fingerprint may be read prior to reading the gesture and transformations occurring in the fingerprint in response to the gesture. The fingerprint may be stored in the form of a fingerprint template (Block 304). Authentication device 100 may thus use the single-factor authentication method of fingerprint validation against the stored fingerprint template as a preliminary check, prior to running the multi-factored gesture-based authentication of the present disclosure.

In various embodiments, authentication device 100 may read a gesture and fingerprint transformation (Block 306). The fingerprint transformation may occur in response to a gesture being performed with the fingerprint pressed against a scanner 106. The fingerprint may deform and/or move from a start position in response to the fingerprint sliding against the scanner during the gesture. The deformations may change at various moments during the gesture, and the changes may be captured and stored digitally on authentication device 100. Authentication device 100 may then convert the gesture and fingerprint transformation (Block 308). For example, authentication device 100 may convert an ordered series of fingerprint images into fingerprint templates corresponding to the state of the fingerprint during the gesture. The fingerprint templates may be matrices describing the minutia of the fingerprint, though other data structures may also be used for fingerprint templates. One or more transformations occurring in the fingerprint minutia during the gesture may also be read and converted to a digital format.

In various embodiments, authentication device 100 may then store the fingerprint templates and/or the fingerprint transformation (Block 310). The fingerprint templates may be stored as matrices with the fingerprint transformations stored as matrix transformations to be applied to the matrices. The transformation may also be stored in a series of fingerprint templates capturing the transformation of fingerprint minutia in response to the gesture.

Figure 4:
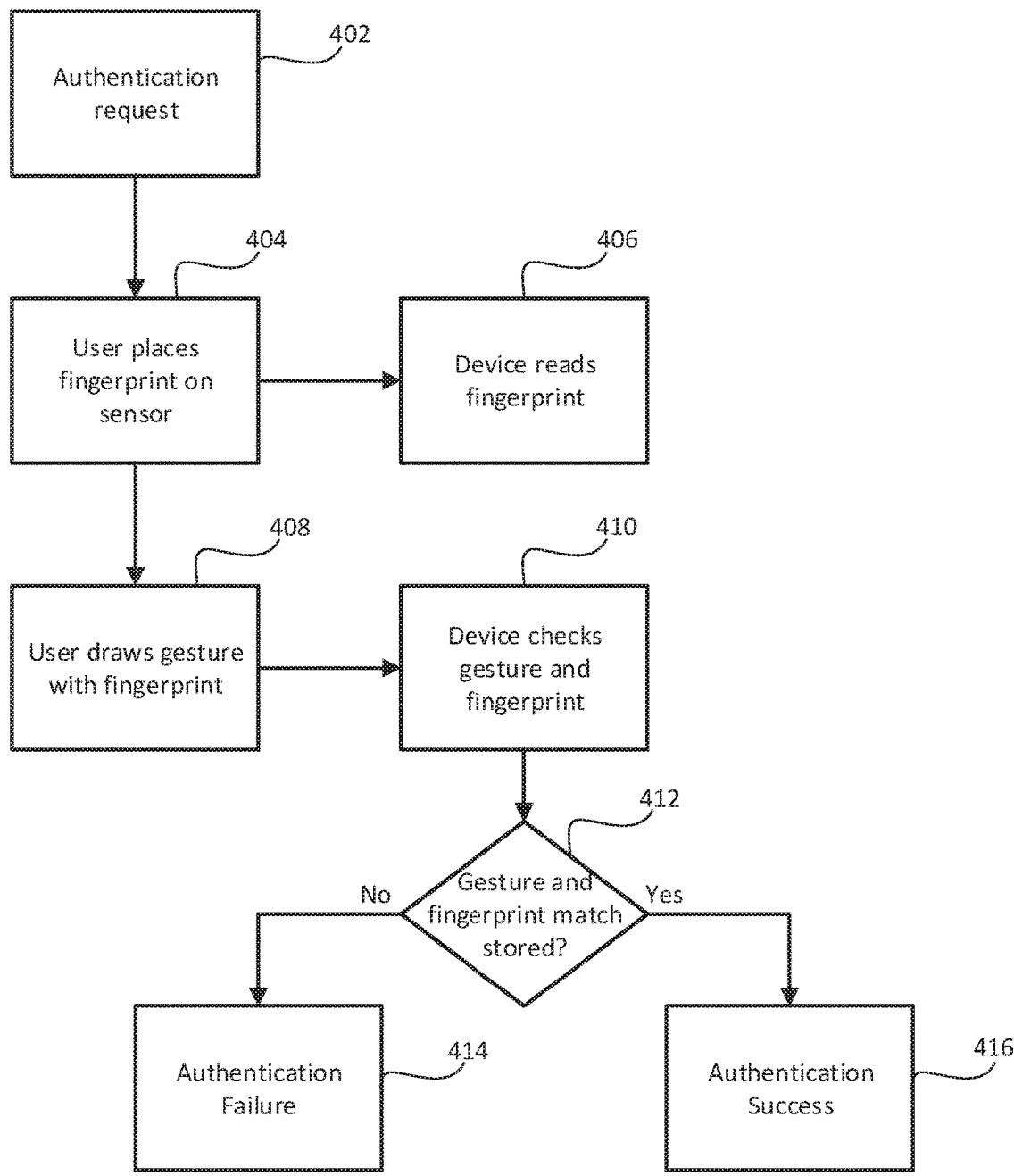
FIG. 4 illustrates an exemplary validation system for interaction between a user and an authentication device in validating a gesture-based biometric key, in accordance with various embodiments.

With reference to FIG. 4, a system 400 for user authentication based on a gesture made with a fingerprint is shown for execution on authentication device 100, in accordance with various embodiments. The system begins with an authentication request (Block 402). A user, application, or device may make the authentication request and await an authentication evaluation from authentication device 100. A user may place a finger on the scanner 106 (Block 404). The finger may be oriented with the fingerprint facing and contacting scanner 106. Authentication device 100 may read the fingerprint (Block 406). The read fingerprint may be converted to a fingerprint template and compared to a previously stored fingerprint template corresponding to the user to be authenticated. The device may make a determination that the fingerprint matches or does not match the previously stored fingerprint template and validate or invalidate the user accordingly. Authentication device 100 may not indicate a failed authentication to the user until after the gesture is drawn to limit the information available to an unauthorized user for attacking the device.

In various embodiments, the user may draw a gesture with the fingerprint (Block 408). The fingerprint may be directed towards scanner 106 during the gesture and may slide on scanner 106 during the gesture. Minutia of the fingerprint may deform and translate in response to the gesture and the friction between the fingerprint and the surface of scanner 106. The transformation of the fingerprint minutia during the gesture may be detected by scanner 106. Authentication device 100 may then check the gesture and fingerprint against a previously stored gesture and fingerprint (Block 410).

In various embodiments, authentication device 100 may convert the gesture and fingerprint into a series of fingerprint templates and compare the fingerprint templates to a previously stored series of fingerprint templates. Authentication device 100 may also convert the gesture and fingerprint into a transformation of the fingerprint minutia over the gesture and match the transformation to a previously stored transformation. Whether the gesture and fingerprint match the stored values may determine whether authentication is successful (Block 412). If the read gesture and fingerprint match the stored values then authentication device 100 may signal authentication success (Block 416). If the read gesture and fingerprint do not match the stored values then authentication device 100 may signal authentication failure (Block 414).

Figure 5:
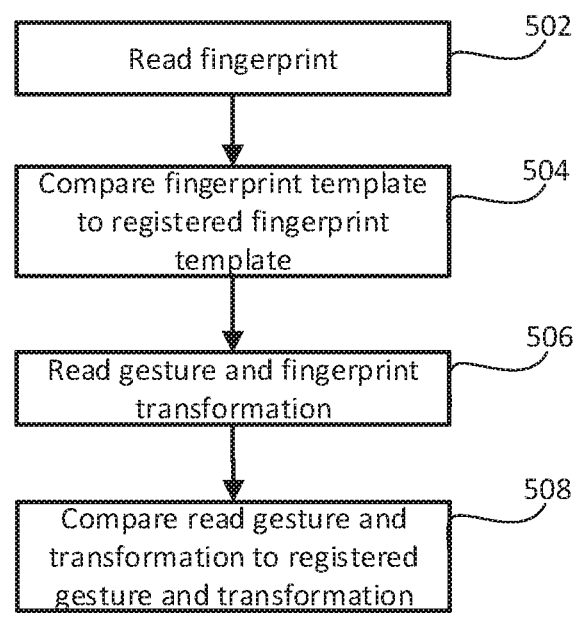
FIG. 5 illustrates an exemplary process for execution by an authentication device in validating a gesture-based biometric key, in accordance with various embodiments.

With reference to FIG. 5, process 500 is shown for authenticating a user on authentication device 100 based on a gesture made with a fingerprint against scanner 106, in accordance with various embodiments. Authentication device 100 may read a fingerprint using scanner 106 (Block 502). Authentication device 100 may read the fingerprint in response to an authorization request by a user. The read fingerprint may be compared to a previously registered fingerprint (Block 504). The previously stored fingerprint may be stored as a fingerprint template, as illustrated in block 304 of FIG. 3, for authentication of an associated user. For example, the read fingerprint may be converted to a fingerprint template and compared to a previously scanned and stored fingerprint template associated with a user.

In various embodiments, authentication device 100 may authenticate the requesting user in response to the fingerprint templates matching within a predetermined accuracy. The predetermined accuracy may allow for slight variations in the read fingerprints that may be caused by environmental conditions, scanning a partial print, or artifacts introduced by the scanner. In that regard, an exact match between fingerprint templates may not be required to authenticate a user depending on the desired level of security. The fingerprint may be checked alone as a preliminary form of single-factor authentication to supplement the multi-factor authentication of the fingerprint gesture.

In various embodiments, the authentication device 100 may then read a gesture and fingerprint transformation using scanner 106 (Block 506). A transformation of fingerprint minutia may be detected by scanner 106 in response to the gesture. Authentication device 100 may then compare the read gesture and transformation to a previously registered gesture in transformation (Block 508). The previously registered gesture and transformation may be captured and stored as described in block 306 through block 310 of FIG. 3. The comparison between gestures may be made in various manners.

In various embodiments, the gesture may be converted to fingerprint templates and compared directly to previously stored fingerprint templates. A match between the newly read and previously stored fingerprint templates may signal authentication success while a non-match may signal authentication failure. Authentication device 100 may also be configured to continuously (i.e., at rapid intervals) scan a fingerprint at scanner 106 during the gesture until an ordered series of fingerprint templates is detected by scanner 106 that matches the previously stored fingerprint templates. Successfully identifying a predetermined percentage of the fingerprint templates may signal successful authorization, while failure to identify the templates indicative of a satisfactory gesture and fingerprint transformation match may signal authorization failure.

In various embodiments, the gesture may be converted into a series of transformations corresponding to the deformation and/or movement of a fingerprint on scanner 106 during the gesture. Authentication device 100 may then match the transformations to a previously stored series of transformations to authenticate the user. Successful authorization may be signaled in response to the transformations matching within a predetermined acceptable margin of error.

The systems and methods herein may enable a strong, multi-factor authentication approach integrating a fingerprint and gesture into one authentication technique. The gesture may be captured in the deformation and/or movement of the fingerprint that occurs in response to the gesture (i.e., the transformations and translations of fingerprint minutia during the gesture). In that regard, checking an integrated gesture and fingerprint may provide increased security over checking weak authentication techniques such as a fingerprint and gesture separately or in series. An attacker may be able to duplicate a fingerprint individually and perform a separate gesture by capturing both parts elsewhere, but an attacker would face a new challenge in duplicating the transformation occurring in the minutia of a fingerprint during a gesture. Furthermore, by storing the fingerprint and gesture data locally and in template form rather than image form, the fingerprint itself may be protected from transmission and unintended proliferation.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to a network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements.

Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In yet another embodiment, the devices and processes disclosed herein may be configured with additional biometric security system that may be used for providing biometrics as a secondary form of identification (i.e., in addition to the compound gesture and fingerprint transformation based system of the present disclosure). The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The security devices and processes of the present disclosure may protect sensitive data such as internal data. Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
  reading, by a processor, minutia in a first state on a first fingerprint on a first scanner;
  reading, by the processor, a change in the minutia from the first state to a second state on the first fingerprint, wherein the change in the minutia includes at least one of a temporary translation, a temporary movement, a temporary deformation, or a temporary location adjustment of the minutia caused by the first fingerprint creating a first gesture;

matching, by the processor, the first state of the minutia and the second state of the minutia on the first fingerprint with a third state of the minutia and a fourth state of the minutia on a second fingerprint; and approving, by the processor, an authentication request based on the matching.

2. The method of claim 1, further comprising converting, by the processor, the third state of the minutia and the fourth state of the minutia into a fingerprint template.

3. The method of claim 1, wherein the reading of the change in the minutia comprises reading the change in at least one of a crossover, a core, a bifurcation, a ridge ending, an island, a delta, a pore, an enclosure, or a spur.

4. The method of claim 1, wherein the first state comprises at least one of a movement or a deformation of the minutia detected by the first scanner.

5. The method of claim 1, further comprising:
converting, by the processor, the first state of the minutia to a first fingerprint template;
converting, by the processor, the second state of the minutia to a second fingerprint template; and
storing, by the processor, the first fingerprint template and the second fingerprint template as matrix transformations.

6. The method of claim 1, further comprising authorizing, by the processor, a user in response to the matching the first state of the minutia and the second state of the minutia on the first fingerprint with the third state of the minutia and the fourth state of the minutia on the second fingerprint.

7. The method of claim 1, further comprising storing, by the processor, the first state of the minutia and the second state of the minutia.

8. The method of claim 1, further comprising reading, by the processor, the first gesture created by the first fingerprint on the first scanner.

9. The method of claim 1, further comprising receiving, by the processor, the authentication request comprising a second gesture created by the second fingerprint on a second scanner.

10. The method of claim 1, further comprising receiving, by the processor, the authentication request comprising the third state of the minutia and the fourth state of the minutia created by the second fingerprint on a second scanner.

11. The method of claim 1, wherein the third state of the minutia and the fourth state of the minutia on the second fingerprint are stored in a database.

12. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
reading, by the processor, minutia in a first state on a first fingerprint on a first scanner;
reading, by the processor, a change in the minutia from the first state to a second state on the first fingerprint, wherein the change in the minutia includes at least one of a temporary translation, a temporary movement, a temporary deformation, or a temporary location adjustment of the minutia caused by the first fingerprint creating a first gesture;
matching, by the processor, the first state of the minutia and the second state of the minutia on the first fingerprint with a third state of the minutia and a fourth state of the minutia on a second fingerprint; and
approving, by the processor, an authentication request based on the matching.

13. The computer-based system of claim 12, further comprising converting, by the processor, the third state of the minutia and the fourth state of the minutia into a fingerprint template.

14. The computer-based system of claim 12, wherein the reading of the change in the minutia comprises reading the change in at least one of a crossover, a core, a bifurcation, a ridge ending, an island, a delta, a pore, an enclosure, or a spur.

15. The computer-based system of claim 12, wherein the first state comprises at least one of a movement or a deformation of the minutia detected by the first scanner.

16. The computer-based system of claim 12, further comprising:
converting, by the processor, the first state of the minutia to a first fingerprint template;
converting, by the processor, the second state of the minutia to a second fingerprint template; and
storing, by the processor, the first fingerprint template and the second fingerprint template as matrix transformations.

17. The computer-based system of claim 12, further comprising authorizing, by the processor, a user in response to the matching the first state of the minutia and the second state of the minutia on the first fingerprint with the third state of the minutia and the fourth state of the minutia on the second fingerprint.

18. The computer-based system of claim 12, further comprising storing, by the processor, the first state of the minutia and the second state of the minutia.

19. An article of manufacture including a non-transitory, tangible computer readable storage medium having instructions stored thereon that, in response to execution by a processor, cause the processor to perform operations comprising:
reading, by the processor, minutia in a first state on a first fingerprint on a first scanner;
reading, by the processor, a change in the minutia from the first state to a second state on the first fingerprint, wherein the change in the minutia includes at least one of a temporary translation, a temporary movement, a temporary deformation, or a temporary location adjustment of the minutia caused by the first fingerprint creating a first gesture;
matching, by the processor, the first state of the minutia and the second state of the minutia on the first fingerprint with a third state of the minutia and a fourth state of the minutia on a second fingerprint; and
approving, by the processor, an authentication request based on the matching.

20. The article of manufacture of claim 19, wherein the reading of the change in the minutia comprises reading the change in at least one of a crossover, a core, a bifurcation, a ridge ending, an island, a delta, a pore, an enclosure, or a spur.

* * * * *